US009769045B2

(12) United States Patent
Khamis (10) Patent No.: US 9,769,045 B2
(45) Date of Patent: Sep. 19, 2017

(54) VALVE SYSTEM FOR A FIBERGLASS SWIMMING POOL BODY (71) Applicant: Thursday Pools, Fortville, IN (US)

(72) Inventor: William Khamis, Fortville, IN (US)

(*) Notice: Subject to any disclaimer, the term of this patent is extended or adjusted under 35 U.S.C. 154(b) by 27 days.

(21) Appl. No.: 14/874,880

(22) Filed: Oct. 5, 2015

(65) Prior Publication Data
US 2016/0215515 A1 Jul. 28, 2016

Related U.S. Application Data (63) Continuation-in-part of application No. 14/477,023, filed on Sep. 4, 2014, now Pat. No. 9,593,455.

(60) Provisional application No. 61/873,468, filed on Sep. 4, 2013.

(51) Int. Cl.
| E04H 4/14 | (2006.01) |
| H04L 12/26 | (2006.01) |
| E02D 17/20 | (2006.01) |
| E02B 3/12 | (2006.01) |
| E04H 4/00 | (2006.01) |
| H04L 12/721 | (2013.01) |
| H04L 29/12 | (2006.01) |
| E04H 4/12 | (2006.01) |
| F16K 15/00 | (2006.01) |
| F16K 17/02 | (2006.01) |

(52) U.S. Cl.
CPC .......... *H04L 43/0876* (2013.01); *E02B 3/122* (2013.01); *E02D 17/202* (2013.01); *E04H 4/0037* (2013.01); *E04H 4/12* (2013.01); *E04H 4/14* (2013.01); *F16K 15/00* (2013.01); *F16K 17/02* (2013.01); *H04L 45/14* (2013.01); *H04L 61/6022* (2013.01)

(58) Field of Classification Search
CPC ....... E04H 4/12; E04H 4/0037; E04H 4/1236; E04H 4/1209; E04H 4/1272; E04H 2004/0068
USPC .............................. 4/490, 496, 504, 506–509
See application file for complete search history.

(56) References Cited

U.S. PATENT DOCUMENTS

| 3,665,524 A | * | 5/1972 | Jannuzzi, Sr. ........ E04H 4/1209 4/507 |
| 3,823,690 A | | 7/1974 | Rynberk |
| 3,869,868 A | | 3/1975 | Irsai |
| 3,908,206 A | * | 9/1975 | Grewing ................... E04H 4/12 137/426 |
| 4,060,946 A | | 12/1977 | Lang |

(Continued)

*Primary Examiner* — J. Casimer Jacyna
(74) *Attorney, Agent, or Firm* — C. John Brannon; Brannon Sowers & Cracraft PC (57) ABSTRACT A kit for modifying a preformed swimming pool, including a fluidic access port for positioning through a preformed swimming pool body, a first conduit for fluidically connecting to the fluidic access port and extending away from the preformed swimming pool body, a first hydrostatic valve defining a hydrostatic fluid inlet and a hydrostatic fluid outlet and connectable in fluidic communication with the first conduit for passing water from the hydrostatic fluid outlet into the first conduit and through the fluidic access port, a second conduit connectable in fluidic communication with the first conduit and with the hydrostatic valve outlet, and a third conduit connectable in fluidic communication with the hydrostatic fluid inlet, wherein the third conduit is water permeable.

6 Claims, 8 Drawing Sheets

(56) References Cited

U.S. PATENT DOCUMENTS

| | | | | |
|---|---|---|---|---|
| 4,607,399 A | * | 8/1986 | Yovanofski | E04H 4/12 137/412 |
| 5,790,991 A | * | 8/1998 | Johnson | E04H 4/12 137/423 |
| 6,158,064 A | * | 12/2000 | Downs | E04H 4/12 4/507 |
| 6,637,162 B1 | | 10/2003 | Holland | |
| 7,425,107 B2 | | 9/2008 | Derache | |
| 7,934,273 B1 | * | 5/2011 | Goettl | E04H 4/1236 4/504 |
| 8,011,032 B2 | * | 9/2011 | Cline | E04H 4/129 4/506 |
| 8,011,859 B2 | | 9/2011 | Freitag | |
| 2006/0162063 A1 | | 7/2006 | Weissenecker | |
| 2007/0144082 A1 | | 6/2007 | Kantor | |
| 2008/0290046 A1 | * | 11/2008 | King | C02F 1/008 210/754 |
| 2011/0252557 A1 | | 10/2011 | Oat | |

* cited by examiner

VALVE SYSTEM FOR A FIBERGLASS SWIMMING POOL BODY

CROSS-REFERENCE TO RELATED APPLICATIONS

This patent application claims priority to co-pending U.S. patent application Ser. No. 14/477,023, filed on Sep. 4, 2014, which claimed priority to then U.S. Provisional Patent Application Ser. No. 61/873,468, filed on Sep. 4, 2013.

TECHNICAL FIELD

The present novel technology relates generally to the field of excavation, and, more particularly, to an in-ground fiberglass pool bodies stabilized with extended geotextile sheets.

BACKGROUND

Preformed fiberglass swimming pools offer many advantages over in-situ formed shotcrete or concrete walled swimming pools. Fiberglass pool bodies may be quickly and inexpensively formed and require considerably less effort to put into the ground. The main drawback associated with fiberglass swimming pools has been the tendency for the sides to bulge inward if the backfill around the pool is not properly done. The backfill around the pool perimeter is typically sand, gravel, or a combination of the two. In the case of sand, a poor backfilling job may result in settling of the sand, which may lead to an inward bulging of the pool sidewalls. Gravel backfill is less prone to flowing and settling, but is harder to evenly distribute around the outer surface of a pool, especially if that surface is irregular. Further, some pool owners insist upon emptying the pool of water, such as for thorough cleaning, and fiberglass pool designs rely on the water to provide positive pressure to resist inward bulging of the sides.

Thus, there remains a need for a method and apparatus that would allow easy installation of a preformed fiberglass pool body while providing additional support to resist the inward bulging of the pool sidewalls over time. The present novel technology addresses this need.

SUMMARY

The present novel technology relates to a method and apparatus for providing a sidewall support and reinforcement system around a fiberglass swimming pool. One object of the present novel technology is to provide an improved fiberglass swimming pool system. Related objects and advantages of the present novel technology will be apparent from the following description.

DETAILED DESCRIPTION OF THE PREFERRED EMBODIMENT

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Geotextiles are stable fabrics designed to not degrade when embedded in soil for extended periods of time. Geotextiles are also permeable so as to allow the passage of fluids therethrough, such that they may be used to provide reinforcement without also creating a drainage problem. Geotextile materials are typically made from polymers such as polypropylenes, polyesters, or the like, and may be formed by such processes as weaving, spin melting, heat bonding, or the like.

The present novel technology relates to a system 10 for mounting or installing a fiberglass or like preformed swimming pool body 15 into a freshly dug excavation, and includes a at least one, and more typically a plurality of, flexible, tough sheet segments 20 securely bonded to one or more exterior sidewalls 25 of the pool body 15 for extension therefrom. Typically, a plurality of geotextile, fiberglass, or like material anchoring sheets 20 are bonded to the pool body 15 at one or more exterior sidewalls 25 at one or more different elevations 30 (distances from the top lip 35 of the pool body 15 when oriented for positioning in the ground) and are spaced around the pool body perimeter. Prior to putting the pool body 15 into the ground, each geotextile sheet 20 is typically rolled up and secured to the pool sidewall 20 for transport and convenience of storing, such as with a zip tie or the like. After the pool body 15 is positioned into the excavation, the excavation around the pool body 15 is backfilled (typically with gravel) to the level of the lowermost sheet(s) 20. The lowermost sheets 20 are unrolled and extended over the backfill surface and are placed thereupon, and additional backfill material (typically soil and/or sand and/or gravel and/or combinations thereof) is backfilled into the excavation onto the extended sheets 20. When the level of backfill material reaches the level of the next set of sheets 20, the sheets 20 at that elevation 30 are likewise extended and the filling process is continued. The weight of the soil pressing on the extended sheets 30, as securely bonded to the fiberglass outer walls 25, is sufficient to generate an outward force on the walls 25 to at least partially counter the inward force produced by the soil around the pool body 15. Optionally, the backfill may be compacted manually or with a mechanical compactor at one or more points during the backfilling process.

The geotextile sheets 20 are typically about a meter wide or long, and typically extend up to about meter from the pool sidewall, more typically about 0.5 meters, and still more typically about 0.25 meters, although the width and length of the sheets 20 may vary from pool body 15 to pool body 15. Likewise, the total number of sheets 20 required will vary with the total surface area of the pool sidewalls 25. In other words, bigger pool bodies 15 may require more sheets 20.

Typically, the sheets 20 are attached at elevations (depths or distances) 30 of about two feet from the lip 35 of the pool body 15, about four feet from the lip 35 of the pool body 15, and about six feet from the lip 35 of the pool body 15. These distances may vary with pool body 15 depth, and some pool bodies 15 may require sheets 20 positioned at only one or two elevations 30. Alternately, the sheets 20 may each be attached at their own individual elevations 30 or distances from the pool body lip 35.

The sheets 20 are typically securely bonded to a pool exterior sidewall 25, such as by an additional application of a fiberglass fusion bonds or volumes 40, by an adhesive material bond 40, or the like.

In operation, the sheets 20 extend from the pool body 15 to which they are secured into the excavation into which the pool body 15 has been placed. Backfill is poured to partially fill the excavation. Respective portions of at least some of the respective sheets 20 (typically those positioned at the lowermost elevations 30 or levels from the lip 35) extend onto the relatively flat, horizontal backfill portion that has partially filled the excavation around the pool body 15, where they are anchored such as by extending anchoring members therethrough, by positioning weighted masses (i.e., more backfill) thereupon, or the like. This process is repeated until all of the sheets 20 have been extended onto backfill and then covered with more backfill and buried and anchored in place. The weight of the backfill material on the sheets 20 generates a frictional anchoring force thereupon that resists movement of the sheets 20, thus creating a pulling force on the pool exterior sidewalls 15 opposing any pushing force generated by the backfill thereagainst.

This process may define a method of stabilizing the sidewalls of a preformed swimming pool body 15, including bonding a first anchor sheet 20 to an exterior surface 25 of a preformed swimming pool body 15 and then extending the first anchor sheet 20 over a first volume of backfill material 45, followed by laying the extended first anchor sheet 20 on a first volume of backfill surface 50 and then burying the extended first anchor sheet 20 under a second volume of backfill material 45. The method is continued by next bonding a second anchor sheet 20 to an exterior surface 25 of a preformed swimming pool body 15, extending the second anchor sheet 20 over the second volume of backfill material 45, laying the extended second anchor sheet 20 on a second volume of backfill surface 50 and finally burying the extended second anchor sheet 20 under a third volume of backfill material 45. Additional elevations 30 of sheets 20 may be added accordingly. The anchor sheet 20 is typically a porous geotextile material. Typically, the first and subsequent anchor sheets 20 each define a plurality of geotextile segments arrayed in a row around the preformed swimming pool body 15 and positioned substantially equidistantly from a top edge 40. The backfill material 45 is typically selected from the group comprising soil, sand, gravel and combinations thereof.

The pool body 15 may be of any convenient shape, including rectangular, generally rectangular, kidney shaped, round, oval, or the like. The sheets 20 may extend from opposing sidewalls 25, adjacent sidewalls 25, from random positions, or the like.

In one alternate embodiment, geotextile sheets 20 are affixed to fiberglass pool bodies 15 already put into the ground. The soil and/or backfill material around the emplaced pool bodies 15 is partially excavated, and one or more geothermal sheets 20 are attached at one end to the pool body sidewall 25, such as with a fiberglass application, adhesive, or the like. The sheets 20 are then extended and the excavated soil and/or backfill is replaced to weight down and bury the one or more sheets 20 to hold them in place and generate the pulling forces on the fiberglass pool sidewall 25.

In another embodiment, as seem in FIGS. 5-9, a hydro valve system 100 is disclosed for equalizing water pressure without and within the pool body 15. The system 100 includes a fluidic access port 110 positioned on or through the pool sidewall and extending therethrough. The port 110 is typically positioned within twenty-four inches of the bottom of the pool body 15, more typically within twelve inches from the bottom of the pool body, and still more typically within 6 inches from the bottom of the pool body. A fluidic conduit 115 extends generally horizontally from the port 110 to a T-junction or like intersection 120 with an elongated fluidic conduit portion 125. The T-junction 120 connects to the fluidic conduit 125, which extends generally vertically away from the T-junction 120 toward the top edge 35, and is typically positioned generally perpendicularly to conduit 115. Fluidic conduit 130 typically extends generally vertically away from the T-junction 120 opposite conduit 125, i.e., away from the top edge 35. Conduit 125 typically includes a (typically threaded) terminal end 135 near the top edge 35 and more typically includes a (typically threaded) cap 140 removably engageable to the terminal end 135.

Conduit 130 typically connects to an L-shaped or like connector or joint 143, which connects at one end to conduit 130 and at the other end to conduit 150 through check valve 155 operationally connected thereoto. Conduit 150 extends perpendicularly to conduit 130, and is typically positioned below the bottom of the pool body, and may be directed away from, parallel to, or under the pool body 15. Conduit 150 is typically perforated or otherwise water permeable, and is more typically covered by a silt sock 160 for allowing passage of water therethrough while blocking particulate matter. The check valve 155 allows for flow from conduit 150 to conduit 130, but not from conduit 130 to conduit 150.

Figure 1:
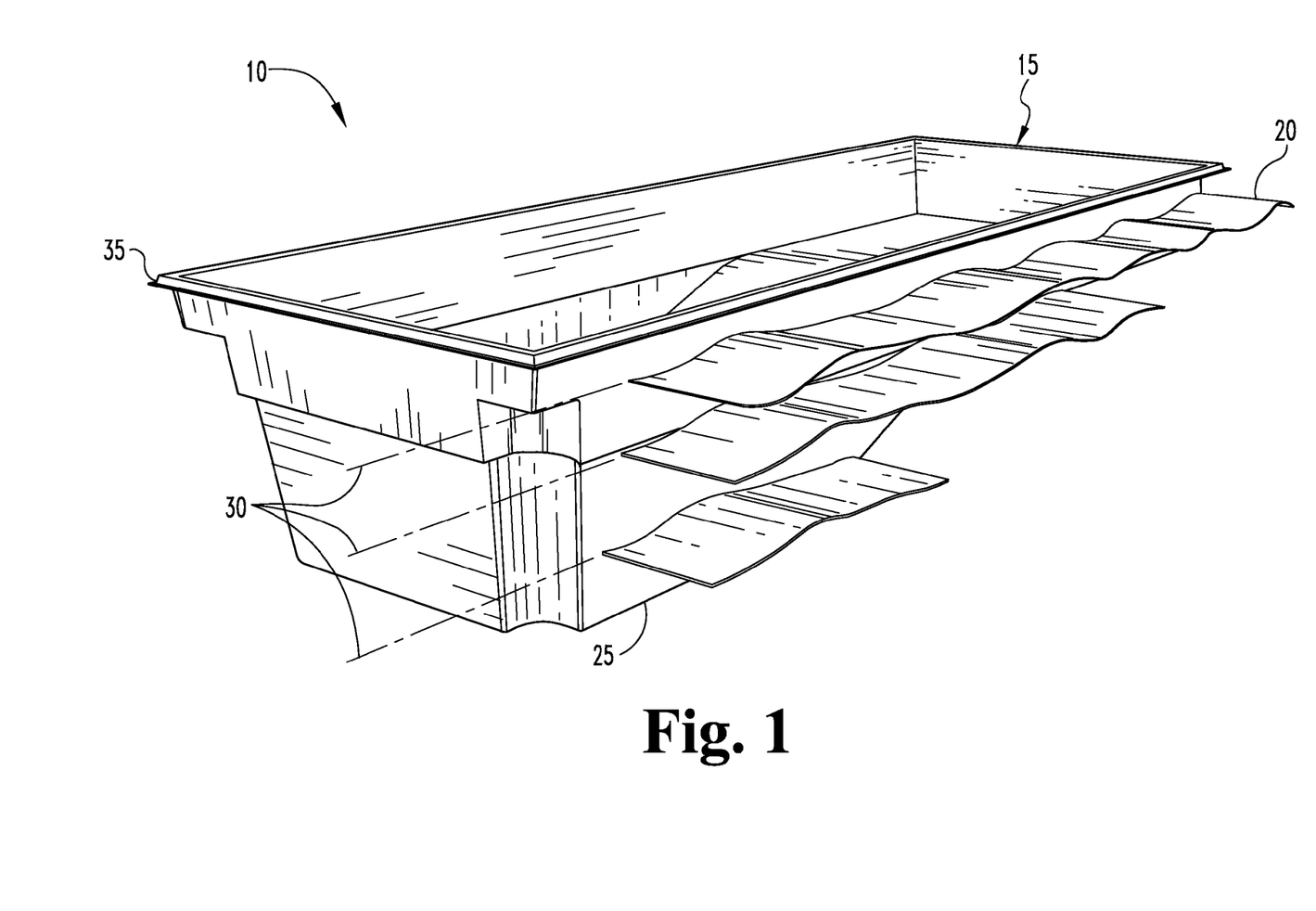
FIG. 1 is a top plan view of a first embodiment fiberglass pool assembly of the present novel technology.
Figure 2:
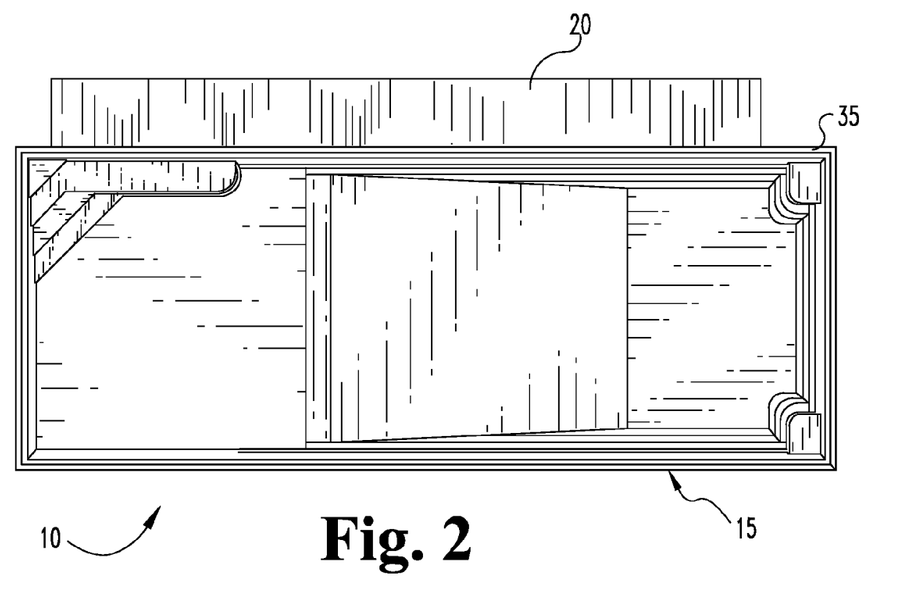
FIG. 2 is a side elevation view of the pool assembly of FIG. 1
Figure 3:
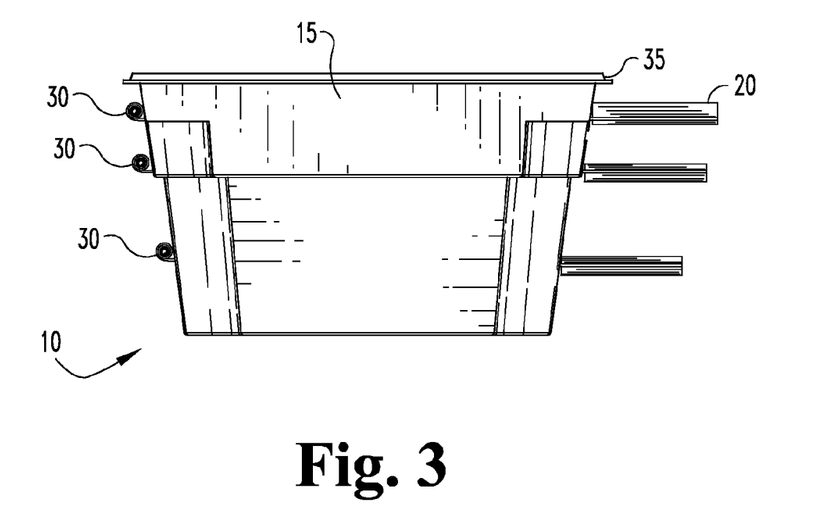
FIG. 3 is a perspective view of the curtain of FIG. 1 having anchor sheets deployed therearound.
Figure 4:
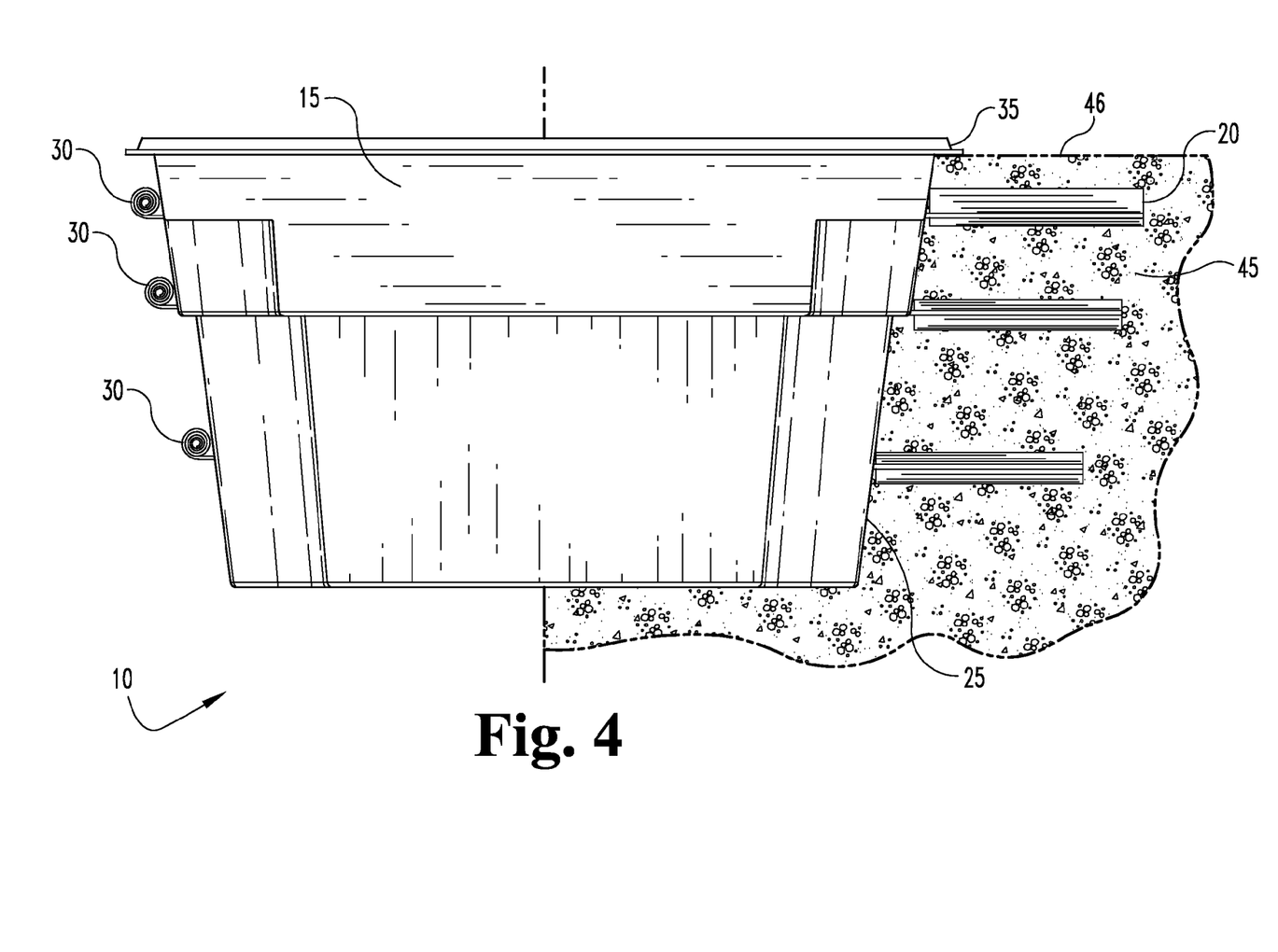
FIG. 4 is a perspective view of the curtain of FIG. 1 having attached anchor sheets rolled up against the pool body.
Figure 5:
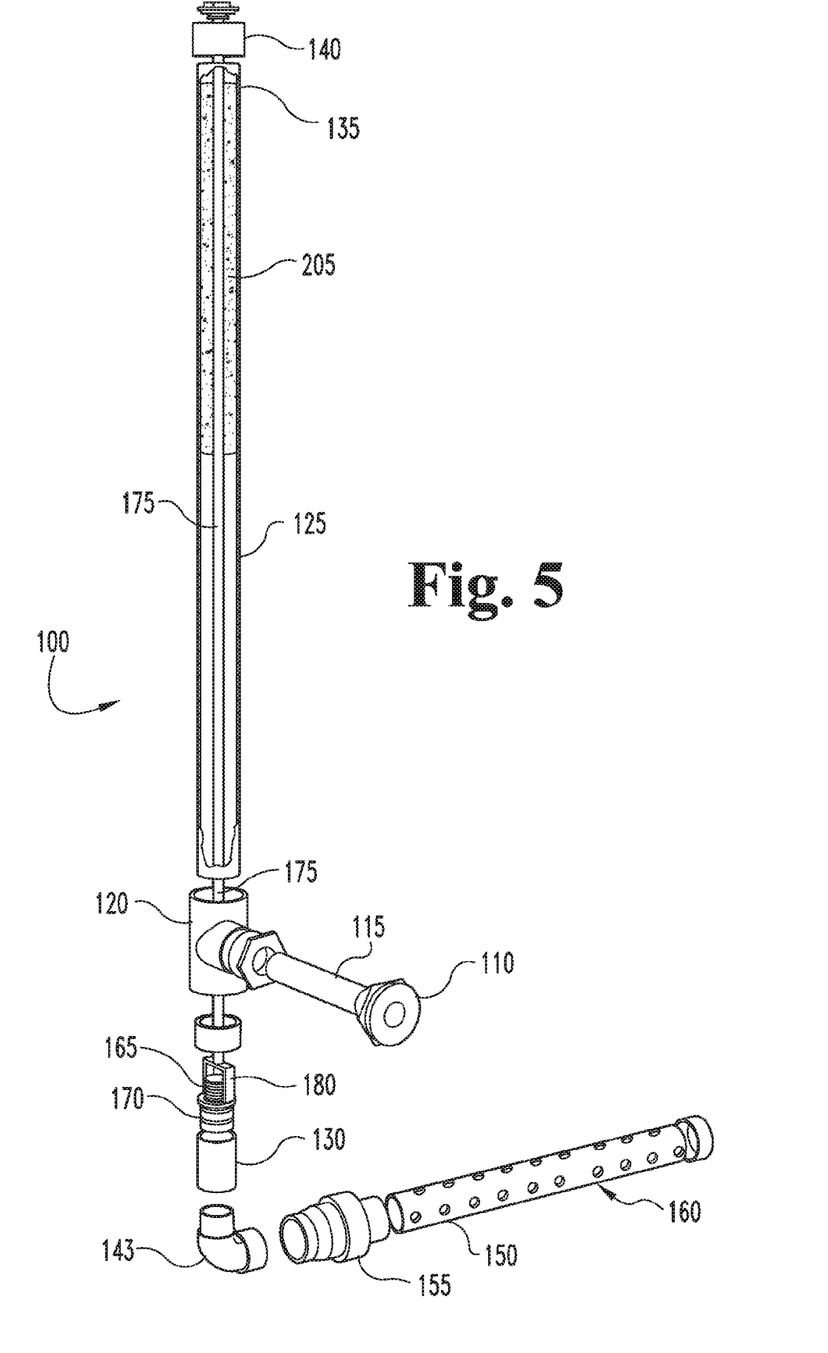
FIG. 5 is an exploded perspective view of a hydro valve system for equalizing hydrostatic pressure without and within a pool body, according to another embodiment of the present novel technology.
Figure 8:
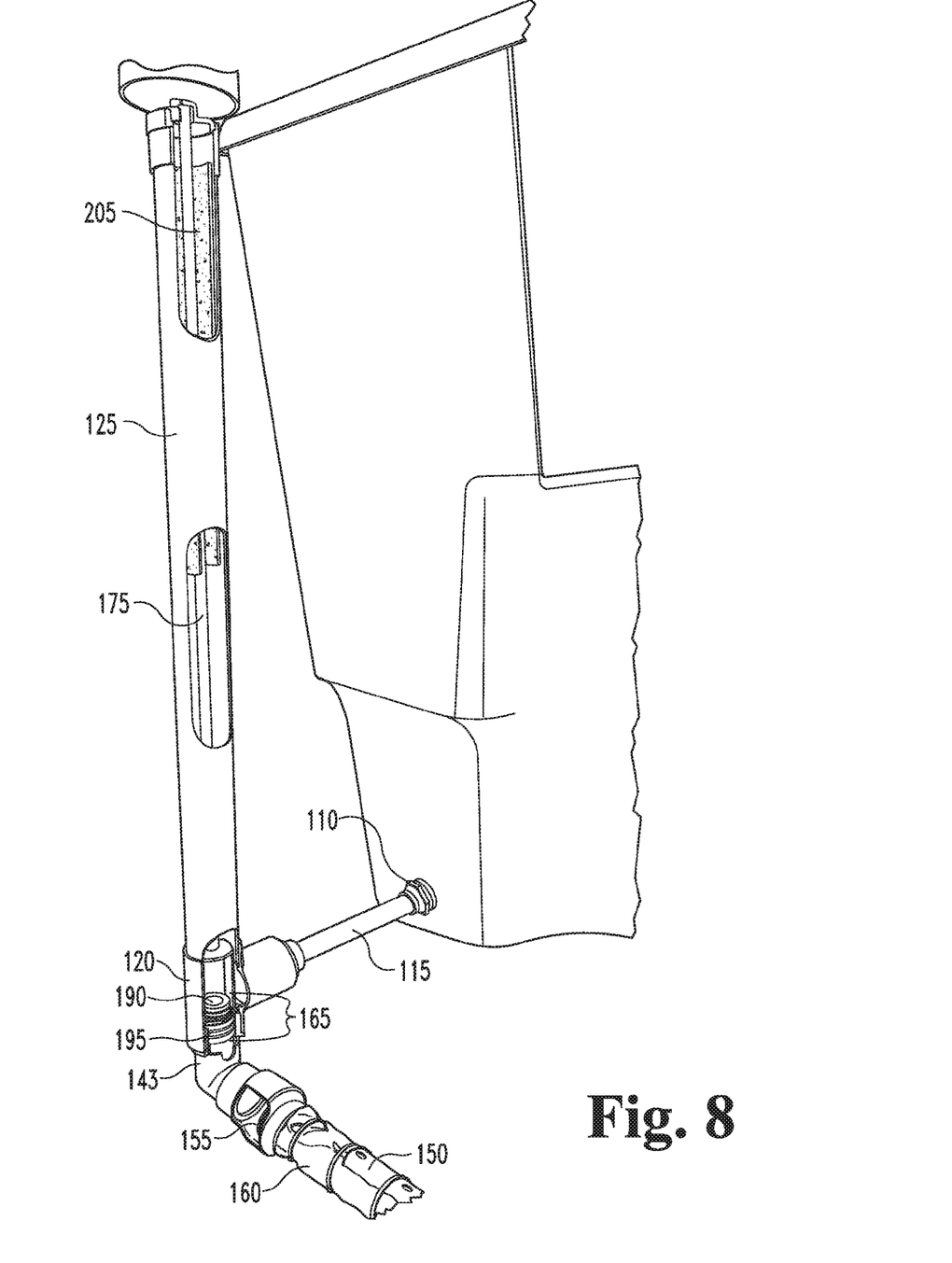
FIG. 8 is an enlarged partial perspective cutaway view of the valve system of FIG. 7.
Figure 9:
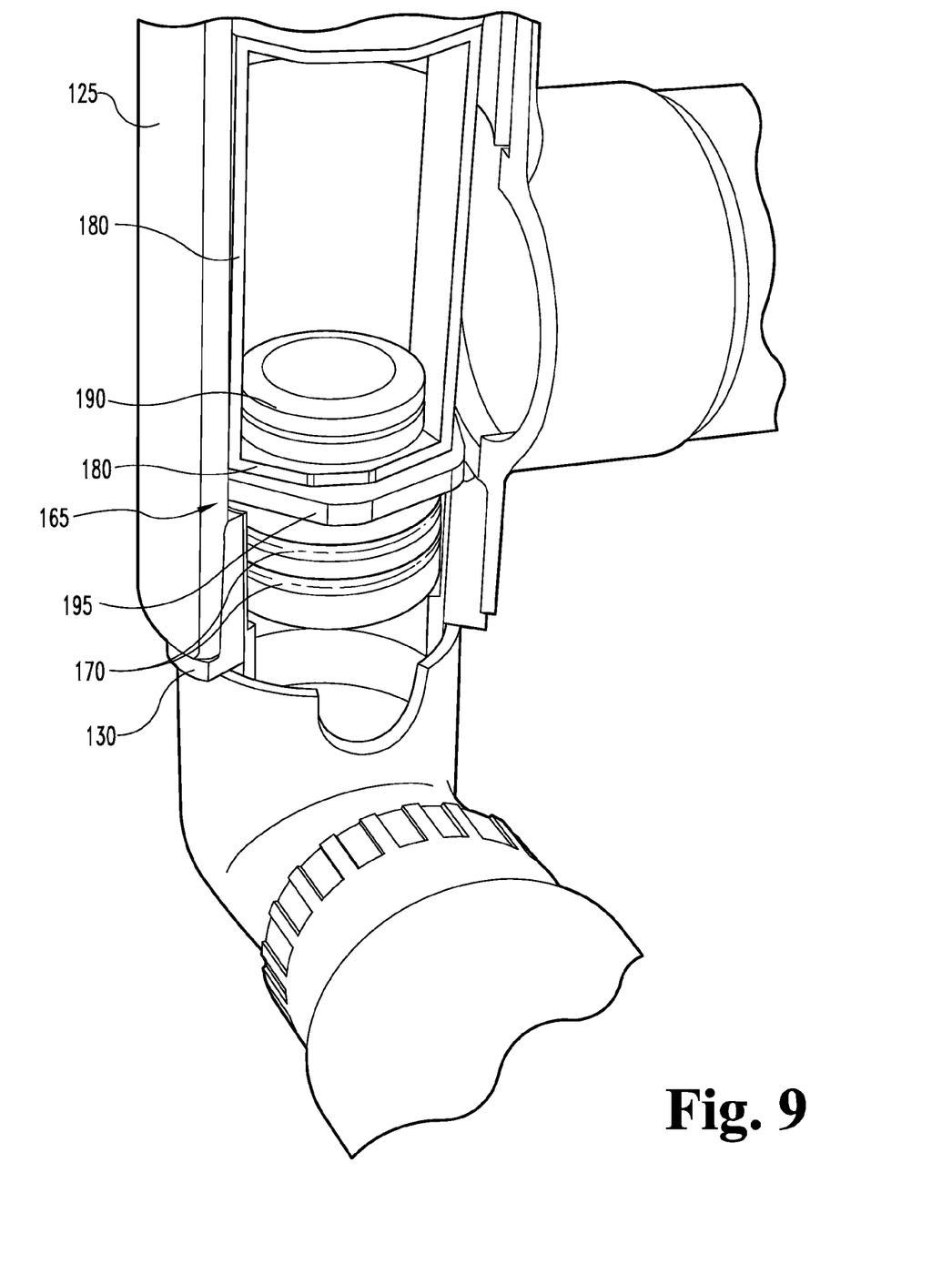
FIG. 9 is an enlarged partial perspective cutaway view of the valve system of FIG. 8.

Hydrostatic valve 165 is removably positioned in conduit 130. Typically, conduit 130 defines an inner diameter sized to snugly receive hydrostatic valve assembly 165 in an interference fit. Hydrostatic valve 165 is opened by pressure from and directs water flowing from conduit 150 through check valve 155 and into conduit 130 and on through conduit 115 into the pool body 15, in the event of an excess of build-up of water under the pool body 15. Hydrostatic valve 165 is closed by the flow of water from the pool body 15 through conduits 115 toward conduit 130. The water pressure associated with excess water building up under the pool body 15 is thus relieved by directing the excess water into the pool body 15, reducing the likelihood of the water pressure upwardly urging and displacing the pool body 15.

Hydrostatic valve 165 is held in place in conduits 120 and/or 130 by one or more O-rings 170 or like members snugly encircling valve 165 and participating in an interference fit with conduits 120 and/or 130, resting in preformed grooves or the like, and may be inserted and/or removed through conduit 125, such as by use of an elongated removal tool 175 extending through terminal end 135 to conduit 130. Removal tool 175 is typically an elongated structural member, such as a plastic rod or the like, extending from cap 140 through conduit 125 and terminating in a valve gripping member 180. Valve gripping member 180 is typically a hollow cage housing the valve 165, such that an upward force applied to the cage 180 via the elongated rod 175 urges the hydrostatic valve 165 up and through the conduit 125 where it may be serviced or replaced if necessary. This allows the hydrostatic valve 165 to be pulled, changed, and/or cleaned from the pool deck without the need of personal submersion. The hydrostatic valve 165 is inserted and/or removed without the need of threading. Leakage or removal of the hydrostatic valve 165 does not result in water emptying from the pool body 15.

The hydrostatic valve 165 typically includes a first valve portion 190 connectable to a base portion 195, with the base portion 195 supporting the O-rings 170 for connecting within the conduits 120, 130. Conduits 120 and 130 are typically separate, but in some embodiments may be unitary.

A liner 205, typically a closed-cell foam cylinder (such as a commercial pool noodle) is emplaced in cylinder 125 and positioned to extend from adjacent the cap 145 a sufficient distance downward below the freezing depth to displace groundwater that might otherwise fill cylinder 125 during operation. This liner 205 eliminates the need to 'winterize' conduit 125 by preventing water to rise far enough therein such that it might freeze during cold weather and expand sufficiently to rupture conduit 125.

Figure 6:
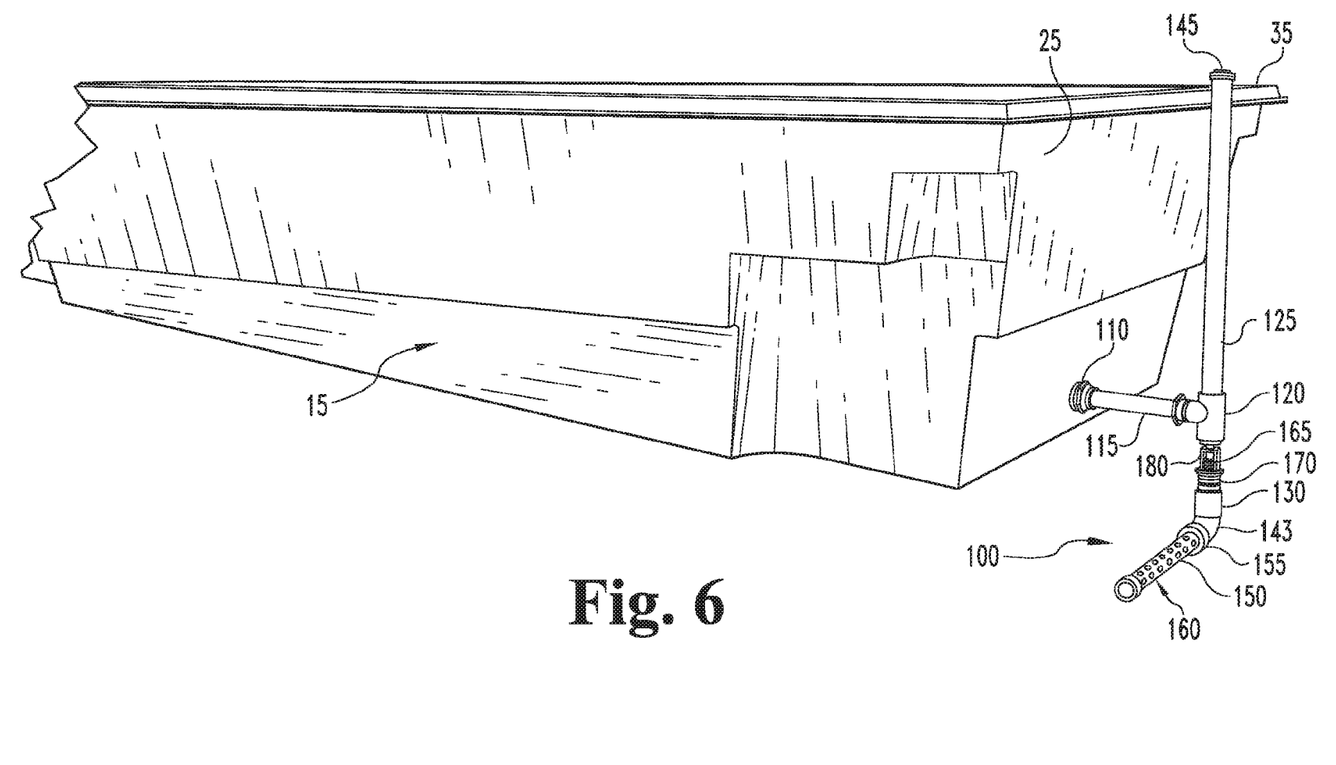
FIG. 6 is a first perspective view of the valve system of FIG. 5 engaged with a pool body.
Figure 7:
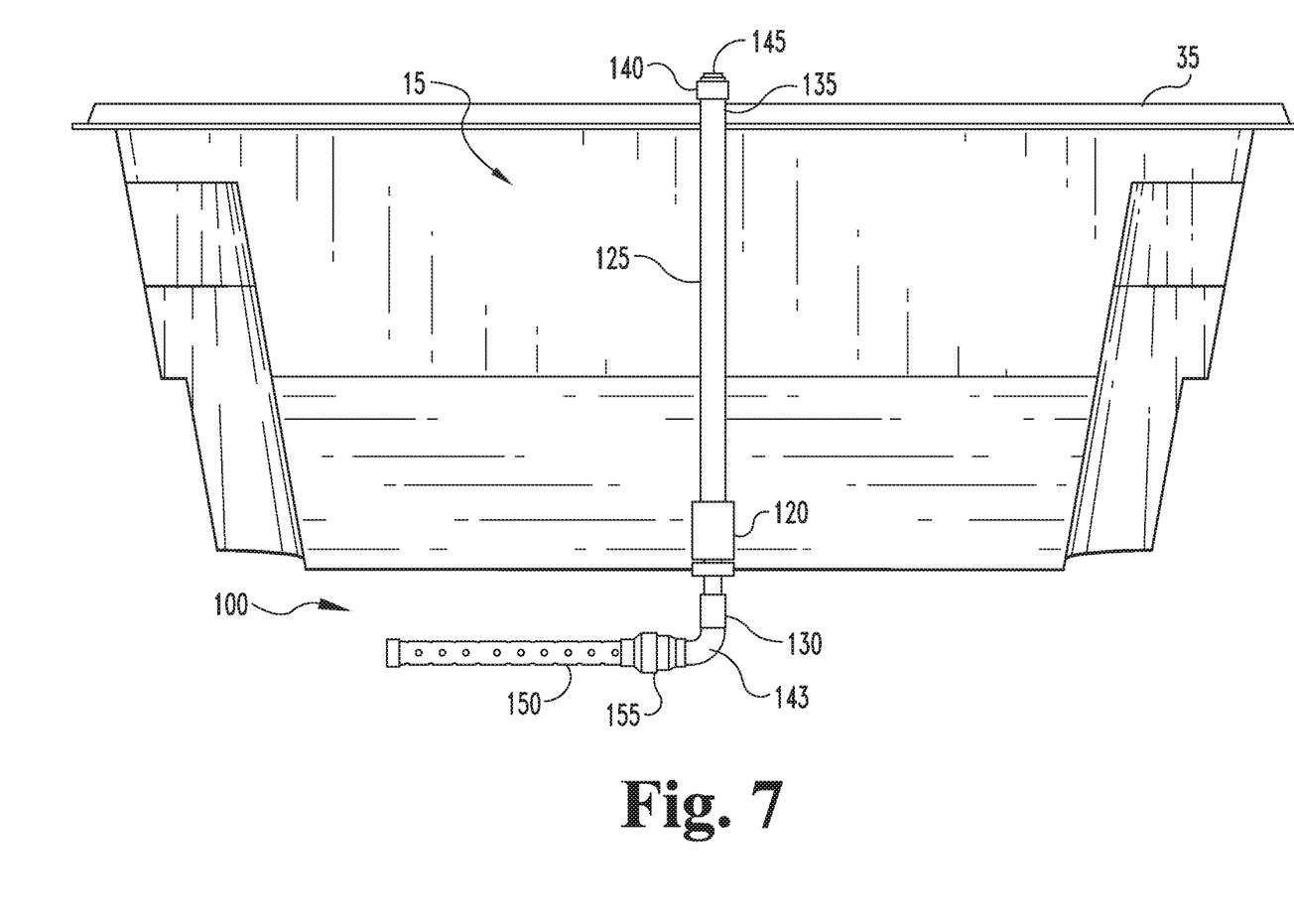
FIG. 7 is a second perspective view of the valve system of FIG. 5 engaged with a pool body.

In operation, the valve assembly 100 is operationally connected to the fluid access port 110 prior to or during placement of the pool body 15 into the ground. The elongated portion extends upwardly generally parallel to the pool body sidewall 25, while conduit 150 typically extends generally perpendicular to the sidewall 25. Conduit 150 is typically positioned below the level of, and more typically generally adjacent to, the pool body 15. The assembly 100 is buried when the pool excavation is backfilled, typically with only the end of elongated conduit 125 and cap 145 protruding above ground.

If the pool, once filled with water, is drained below the level of the ground water surrounding the pool body 15, ground water will flow through conduit 150, through check valve 155 and hydrostatic valve 165 and into the pool body 15 through access port 110. In other words, when the level of the ground water without the pool body 15 is higher than the level of the water within the pool body 15, water will flow thorough the assembly 100 and into the pool body 15 through the access port 110. This prevents damage to the pool body 15 from excessive ground water pressure thereupon, such as bulging of the pool body to the point of cracking or rupture, and/or raising of the entire pool body 15.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A swimming pool assembly, comprising:
    a swimming pool body defining a top edge and an oppositely disposed bottom portion connected by at least one wall;
    a fluidic access port positioned on the swimming pool body;
    a first conduit fluidically connected to the fluidic access port and extending away from the swimming pool body;
    a first hydrostatic valve defining a hydrostatic fluid inlet and a hydrostatic fluid outlet and connected in fluidic communication with the first conduit for passing water from the hydrostatic fluid outlet into the first conduit and through the fluidic access port;
    a second conduit connected in fluidic communication with the first conduit and with the hydrostatic valve outlet and extending toward the top edge;
    a third conduit connected in fluidic communication with the hydrostatic fluid inlet and positioned below the access port;
    wherein the third conduit is water permeable.

2. The assembly of claim 1 and further comprising a check valve operationally connected to the third conduit and in fluidic communication with hydrostatic fluid inlet for allowing passage of water through the third conduit and into the hydrostatic fluid inlet.

3. The assembly of claim 1 and further comprising at least one O-ring snugly encircling the hydrostatic valve; and a hydrostatic valve removal assembly extending through the second conduit and operationally connected to the hydrostatic valve.

4. The assembly of claim 3 and further comprising a fourth conduit portion connected at an interface between the second conduit and the third conduit; wherein the fourth conduit is sized to accept the hydrostatic valve in an interference fit; wherein the hydrostatic valve removal assembly further comprises a housing portion at least partially enclosing the hydrostatic valve and an elongated member connected to the housing portion and extending through the second conduit; wherein an urging force applied to the elongated member in a direction away from the hydrostatic valve allows extraction of the elongated member, the housing and the partially enclosed hydrostatic valve from the second conduit.

5. The assembly of claim 4 wherein the fourth conduit portion is unitary with the second conduit.

6. The assembly of claim 1 and further comprising a water displacement member positioned in the second conduit and extending from parallel the top edge to partially fill the second conduit.

* * * * *